(12) United States Patent
Oka et al.

(10) Patent No.: US 6,846,116 B2
(45) Date of Patent: Jan. 25, 2005

(54) SENSOR HEAD

(75) Inventors: Toru Oka, Tokyo (JP); Hajime Nakajima, Tokyo (JP); Masahiro Shikai, Tokyo (JP); Akihide Shiratsuki, Tokyo (JP); Jurgen Mohr, Karlsruhe (DE); Ulrike Wallrabe, Karlsruhe (DE); Uwe Hollenbach, Karlsruhe (DE)

(73) Assignees: Mitsubishi Denki Kabushiki Kaisha, Tokyo (JP); Forschungszentrum Karlsruhe GmbH, Eggensttein-Leopoldshafen (DE)

(*) Notice: Subject to any disclaimer, the term of this patent is extended or adjusted under 35 U.S.C. 154(b) by 158 days.

(21) Appl. No.: 10/182,628
(22) PCT Filed: Dec. 11, 2000
(86) PCT No.: PCT/JP00/08750
§ 371 (c)(1), (2), (4) Date: Aug. 1, 2002
(87) PCT Pub. No.: WO02/48645
PCT Pub. Date: Jun. 20, 2002

(65) Prior Publication Data
US 2003/0007752 A1 Jan. 9, 2003

(51) Int. Cl.[7] .................................................. G02B 6/42
(52) U.S. Cl. ........................... 385/92; 385/33; 385/93; 385/47; 385/89; 385/12; 250/227.11
(58) Field of Search ............................. 385/92, 33, 93, 385/47, 89, 12; 250/227.11

(56) References Cited

U.S. PATENT DOCUMENTS 5,179,609 A * 1/1993 Blonder et al. ............... 385/89
5,418,765 A    5/1995 Misawa et al.
5,664,032 A * 9/1997 Bischel et al. ................ 385/4
6,198,862 B1   3/2001 Nakajima et al.

FOREIGN PATENT DOCUMENTS

| EP | 1 031 865 A1 | 8/2000 |
| JP | 8-261793 | 10/1996 |
| JP | 10-9813 | 1/1998 |
| JP | 2000-28316 | 1/2000 |

OTHER PUBLICATIONS

U.S. patent application Ser. No. 10/182,770, Oka et al., filed Aug. 1, 2002.

* cited by examiner

Primary Examiner—Anthony Dinkins
Assistant Examiner—Jinhee Lee
(74) Attorney, Agent, or Firm—Leydig, Voit & Mayer, Ltd.

(57) ABSTRACT

A sensor head includes a first substrate provided with a light emitting element and a light detecting element, a one-piece optical structure body on a second substrate, the optical structure body having optical elements for converging incident light in a direction parallel to a surface of the second substrate and for converging an outgoing beam from the light emitting element and a light beam reflected by an object in the direction parallel to the surface of the second substrate, and lenses for converging incident light in a direction perpendicular to the surface of the second substrate and for converging the outgoing beam from the light emitting element and the light beam reflected by the object in the direction perpendicular to the surface of the second substrate, respectively.

5 Claims, 12 Drawing Sheets

SENSOR HEAD

FIELD OF THE INVENTION

The present invention relates to a sensor head that applies a light beam from a light emitting element to an object to be measured and detects a light beam reflected by the object by using a light detecting element so as to acquire information on physical quantities (position, rotational angle, displacement, etc.) of the object to be measured.

BACKGROUND OF THE INVENTION

FIGS. 1 and 2 are views for explaining a prior art encoder disclosed in Japanese patent application publication (TOKKAIHEI) No. 08-261793. FIG. 1 is a perspective view of the prior art encoder and FIG. 2 is a plan view of the prior art encoder. In the figures, reference numeral 1 denotes a semiconductor laser shaped like a letter V, reference numeral 2 denotes two photodiodes, reference numeral 3 denotes a three-layer waveguide in which a core layer 32 is sandwiched by two cladding layers 33, the core layer 32 having a slightly higher refractive index than the two cladding layers 33, reference numeral 5 denotes a light beam emitted out of the semiconductor laser 1, reference numeral 80 denotes a total reflection mirror formed on a vertical surface of the three-layer waveguide 3, reference numeral 83 denotes convex edge faces formed on the waveguide, reference numeral 36 denotes a step formed on one convex edge face 83, reference numeral 51 denotes a parallel light beam emerging from the other convex edge face 83, and reference numeral 6 denotes a scale placed separately from a main body of the encoder.

Next, a description will be made as to the operation of the prior art encoder.

A light beam 5 emitted out of the semiconductor laser 1 is incident upon the core layer 32 of the three-layer waveguide 3 and is then collimated by one convex edge face 83 having a lenticular shape represented by a second-order curve after reflected by the total reflection mirror 80 on the way to the convex edge face 83. The light beam 5 is emitted as a parallel light beam 51 shown in FIG. 2. This parallel light beam 51 is made to be incident upon the scale 6 of grating type which is placed separately from the main body of the encoder. Two parallel light beams 51 are emitted out of the three-layer waveguide 3 and overlap each other on the scale 6 because the two convex edge faces 83 are formed symmetrically with the exception that one of them includes the step 36, and the first-order diffracted light beams diffracted by the scale 6 are incident upon the photodiodes 2.

By disposing the step 36 on the other convex edge face of the three-layer waveguide 3, a parallel light beam 51 emitted from the other convex edge face with the step 36 has two light beams 90 degrees out of phase with each other and is diffracted by the scale 6. Each of them has a +first-order or −first-order diffracted light beam interfere with the −first-order or +first-order diffracted light beam diffracted by the scale 6 that is emitted from the convex edge face 83 which does not have the step 36. They are incident upon to the different photodiodes 2, respectively. When the scale 6 of grating type moves in a direction of its pitches formed therein only by one pitch, the displacement of the scale 6 can be measured by observing a change in one photodiode 2 because a signal caused by the above-mentioned interference of a +first-order diffracted light beam and a −first-order diffracted light beam changes in 2 cycles. Furthermore, not only the relative displacement between the scale 6 and the main body of the encoder but also the direction is detected because the two sinusoidal signals acquired by the two photodiodes are 90 degrees out of phase with each other.

A problem with the prior art encoder constructed as mentioned above is that since when producing the three-layer waveguide 3 having a function of converging in the parallel direction to a surface of a substrate, the core layer 32 and the two cladding layers 33 are laminated alternately, it is impossible to form the three-layer waveguide 3 in one process and the manufacturing cost therefore rises. Another problem is that since the core layer 32 usually has a thin thickness ranging from several micrometers to tens of micrometers and does not have a function of converging an incident light beam in the perpendicular direction to a surface of a substrate, a reflected light beam from the object to be measured cannot be efficiently introduced into the three-layer waveguide 3.

The present invention is proposed to solve the above-mentioned problems, and it is therefore an object of the present invention to provide a small-size and low-cost sensor head which does not need any three-layer waveguide with a high manufacturing cost.

DISCLOSURE OF THE INVENTION

In accordance with the present invention, there is provided a sensor head that applies a light beam from a light emitting element to an object to be measured and detects a light beam reflected by the object by using a light receiving element so as to acquire information on physical quantities of the object to be measured, characterized in that the sensor head includes: a first substrate provided with the light emitting element and the light receiving element; an optical structure body formed in one piece on a second substrate, the optical structure body having a plurality of optical elements intended for converging incident light in a parallel direction parallel to the second substrate, each converging an outgoing beam from the light emitting element and a light beam reflected by the object to be measured in the parallel direction to a surface of a substrate; and a lens intended for converging incident light in a perpendicular direction perpendicular to the second substrate, for converging the outgoing beam from the light emitting element and the light beam reflected by the object to be measured in the perpendicular direction to a surface of a substrate.

Consequently, since the plurality of optical elements (e.g. mirrors or lenses) intended for converging incident light of an incident light beam in the parallel direction to a surface of a substrate can be formed in one piece as the optical structure body, the manufacturing cost can be decreased, each optical element intended for converging incident light of an incident light beam in the parallel direction to a surface of a substrate can be downsized, and the relative position accuracy of each optical element can be improved. Though reflection of the outgoing light beam or detected light beam by the first substrate or the second substrate causes a loss in the optical signal, the reflection on the substrate can be reduced by arranging the lens intended for converging incident light of an incident light in the perpendicular direction to a surface of a substrate and therefore an advantage of being able to improve the signal-to-noise ratio is provided.

The sensor head in accordance with the present invention is characterized in that the first substrate is combined with the optical structure body formed on the second substrate by way of at least two microspheres.

Consequently, there is provided an advantage of improving the accuracy of the relative position between the optical structure body and the light emitting point of the light emitting element or the light receiving surface of the light receiving element when the first substrate is combined with the second substrate.

The sensor head in accordance with the present invention is characterized in that the light emitting element is disposed on a movable plate formed on the first substrate.

Consequently, there is provided an advantage of optimizing the relative position between the optical structure body and the light emitting point of the light emitting element after the first substrate is combined with the second substrate, and also optimizing the shape and diameter of the beam spot of the light beam emitted from the sensor head on the object to be measured.

The sensor head in accordance with the present invention is characterized in that the functionality of the first substrate is provided for the optical structure body and the light emitting element and the light receiving element are directly disposed on the optical structure body.

Consequently, there is provided an advantage of being able to downsize the sensor head and therefore to reduce the manufacturing cost of the sensor head because the first substrate is not needed.

The sensor head in accordance with the present invention is characterized in that in a mold insert used for molding the optical structure body with a resin and a mold insert used for molding the lens intended for converging incident light in the perpendicular direction to the second substrate with a resin are combined and the optical structure body and the lens intended for converging incident light in the perpendicular direction to the second substrate are molded in one piece.

Consequently, there is provided an advantage of being able to reduce the manufacturing cost of the sensor head because the optical structure body and the lenses intended for convergence of incident light beams in the perpendicular direction to a surface of a substrate are formed in one piece, and to improve the accuracy of the relative position of each mirror or each lens.

PREFERRED EMBODIMENTS OF THE INVENTION

Hereafter, to explain the present invention more in detail, preferred embodiments of the present invention will be explained with reference to the accompanied drawings.
Embodiment 1.

Figure 1:
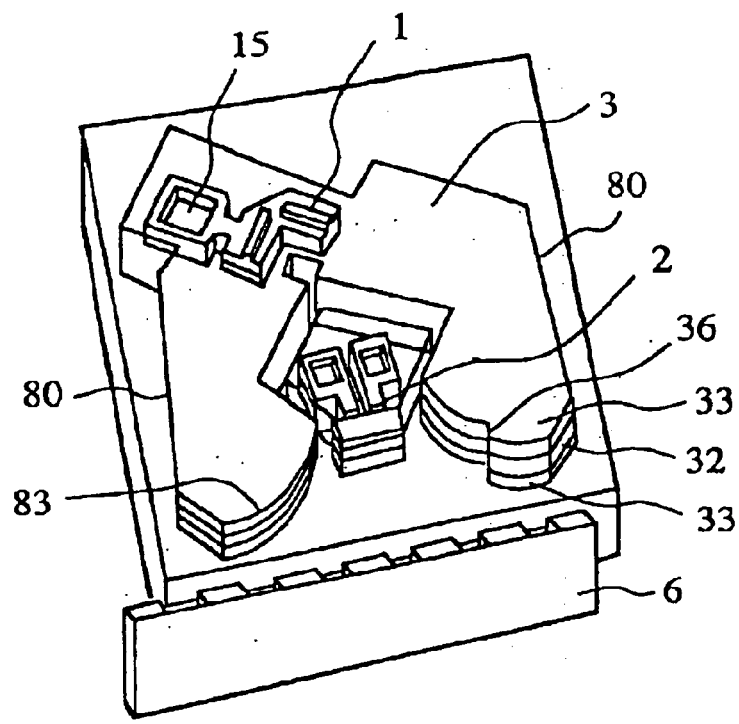
FIG. 1 is a perspective view showing a prior art encoder.
Figure 2:
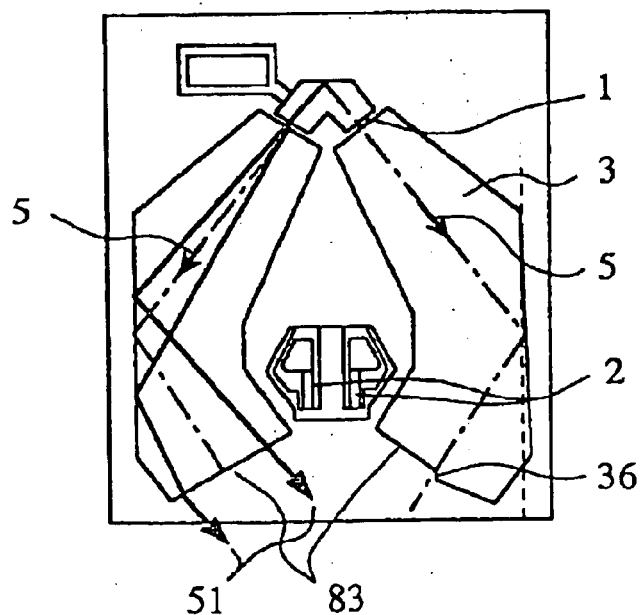
FIG. 2 is a plan view of the prior art encoder.
Figure 3:
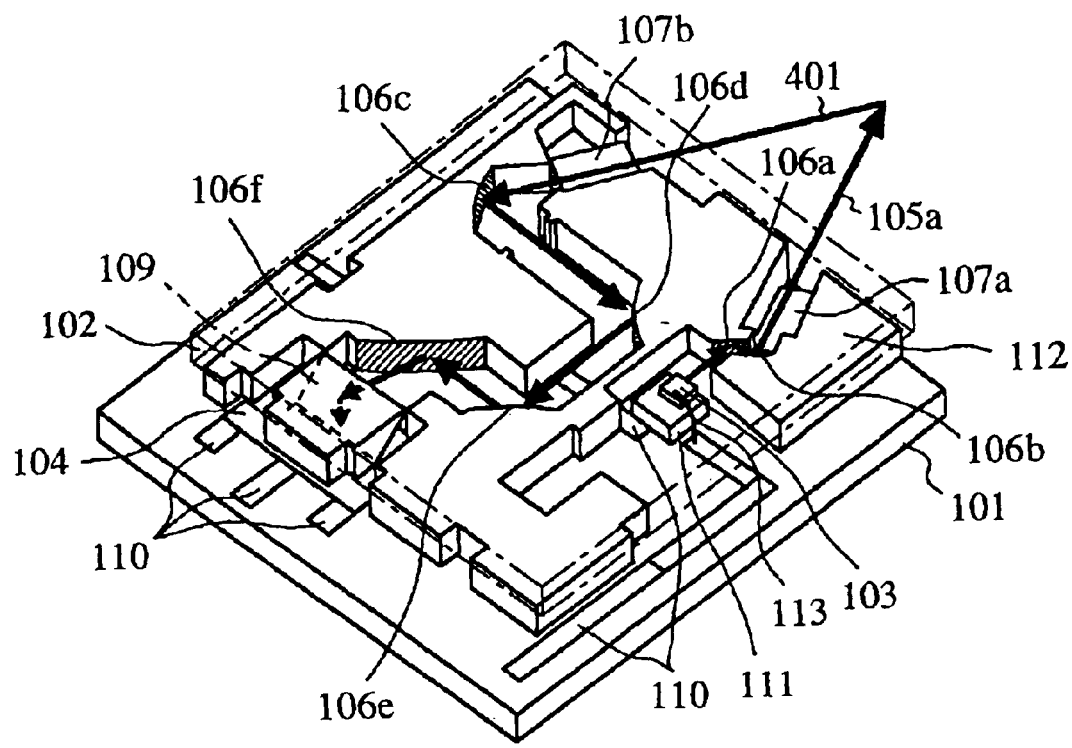
FIG. 3 is a perspective view of a sensor head according to embodiment 1 of the present invention.
Figure 4:
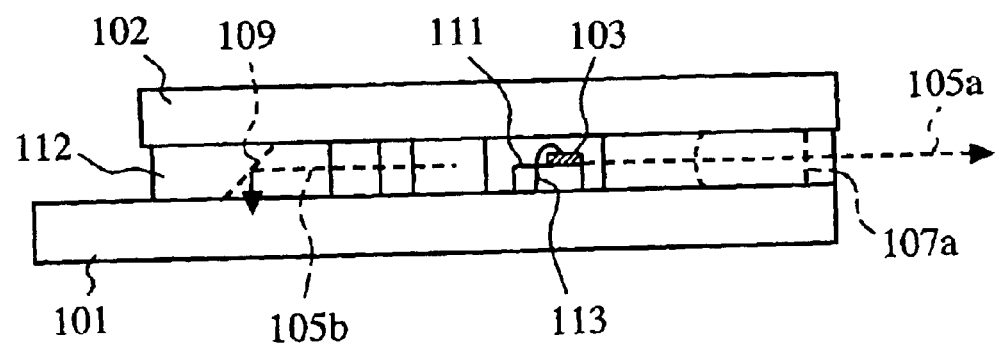
FIG. 4 is a side view of the sensor head according to embodiment 1 of the present invention.
Figure 5:
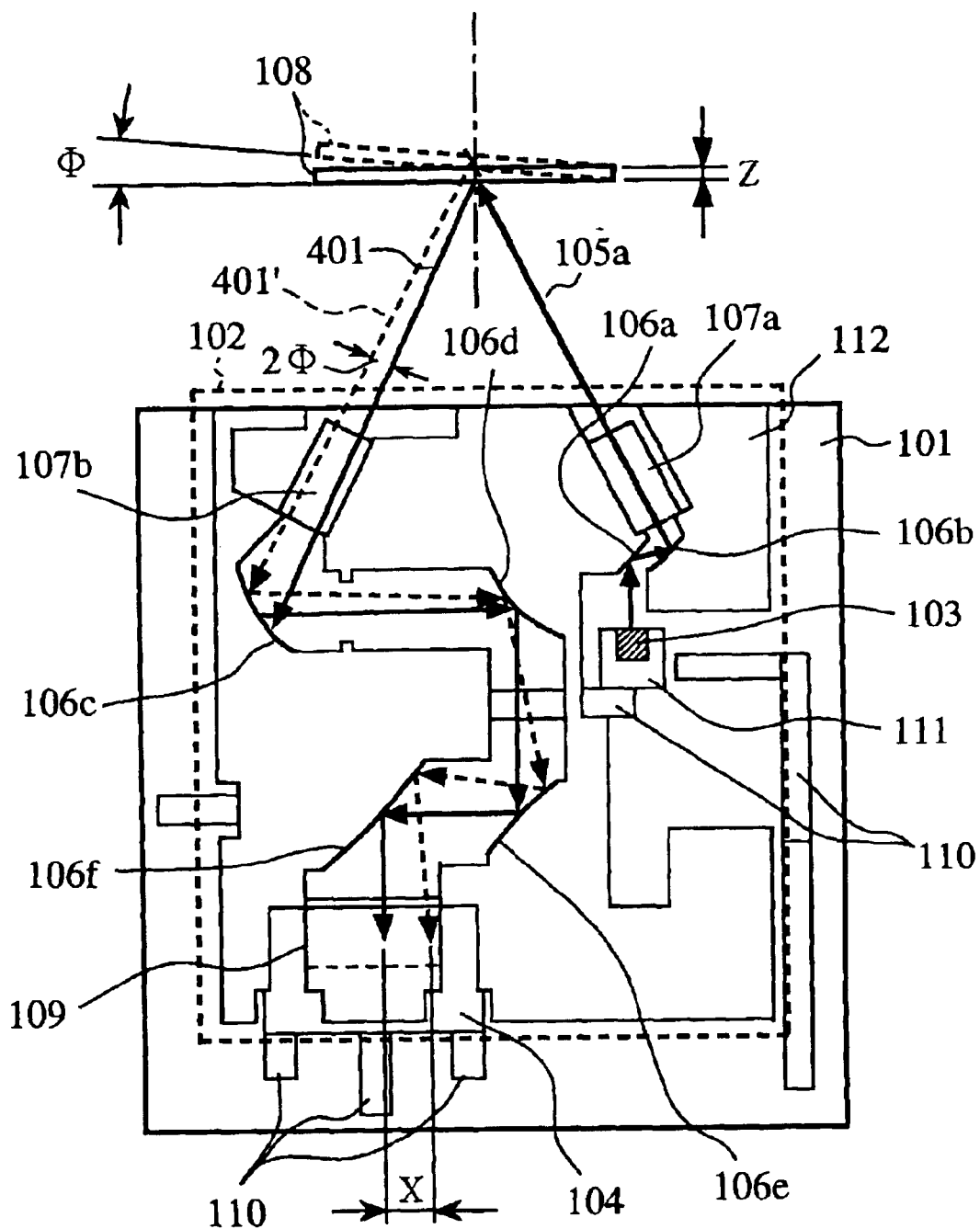
FIG. 5 is a plan view of the sensor head according to embodiment 1 of the present invention.

FIG. 3 is a perspective view showing an optical distance sensor according to embodiment 1 of the present invention, FIG. 4 is a side view of the optical distance sensor, and FIG. 5 is a plan view of the optical distance sensor. A light emitting element 103, such as a semiconductor laser or light emitting diode, as well as necessary electric wiring 110 are disposed, by way of a spacer 111, on a surface of a substrate 101 (first substrate) made of, for example, silicon in such a manner that the optical axis of an outgoing light beam 105a substantially agrees with the central axis of a lens 107a intended for converging an incident light beam along a direction perpendicular to a surface of a substrate, and a position sensitive light detecting element 104, such as a PSD (Position Sensitive Device or Divided photo diode, is formed monolithically.

Under another substrate 102 (second substrate) made of such a material as ceramic, there is provided an optical structure body 112 provided with a plurality of mirrors 106a to 106f intended for converging incident light in a direction parallel to a surface of a substrate (optical elements intended for converging incident light in the direction parallel to a surface of a substrate) having a convergence function, and a mirror 109 intended for deflection of the optical axis of an incident light beam and having a deflection function, which are formed in one piece using a photolithography technology or plastic molding which derives from the technology.

Each of all mirror faces of this optical structure body 112 is provided with a reflection coating and each of other vertical walls of the optical structure body 112 is provided with a reflection coating or absorption film to prevent disturbance light and stray light. Furthermore, there are provided lenses 107a and 107b intended for converging incident light in the perpendicular direction to a surface of a substrate, for converging the outgoing light beam 105a and a directly reflected light beam 401 in the perpendicular direction to a surface of a substrate to prevent them from reflecting and scattering from the substrates 101 and 102, respectively.

The lenses 107a and 107b intended for converging incident light in the perpendicular direction to a surface of a substrate are arranged so that the directly reflected light beam 401 which is a part of the outgoing light beam 105a emerging from the lens 107a intended for converging incident light in the perpendicular direction to a surface of a substrate, which has been reflected by an object to be measured 108, is incident upon the other lens 107b intended for converging incident light in the perpendicular direction to a surface of a substrate.

The sensor head according to this embodiment 1 can implement an optical lever method of measuring the location, displacement and inclination of the direction of the normal to the object to be measured 108 by detecting the directly reflected light beam 401 from the object to be measured 108.

Next, a description will be made as to the operation of the sensor head of embodiment 1.

The outgoing light beam 105a emitted out of the light emitting element 103 is incident upon the object to be measured 108 after it is collimated or it is brought to a focus in a measurement range for the object by the mirrors 106a to 106b intended for converging incident light in the parallel direction to a surface of a substrate and the lens 107a intended for converging incident light in the perpendicular direction to a surface of a substrate.

The directly reflected light beam 401 of light scattered by the object to be measured is mainly incident upon the other lens 107b intended for converging incident light in the perpendicular direction to a surface of a substrate. The directly reflected light beam 401 is then converged by the lens 107b intended for converging incident light in the perpendicular direction to a surface of a substrate and the mirrors 106c to 106f intended for converging incident light in the parallel direction to a surface of a substrate. In addition, after the optical axis of the directly reflected light beam 401 is bent by 90 degrees by the mirror 109 intended for deflection of the optical axis of an incident light beam, the directly reflected light beam 401 is incident upon the position sensitive light receiving element 104. The curvature of the lens 107b intended for converging incident light in the perpendicular direction to a surface of a substrate and the curved shape and inclination against the optical axis of an incident light beam of each of the mirrors 106c to 106f intended for converging incident light in the parallel direction to a surface of a substrate are determined such that the directly reflected light beam 401 is focused to a small light spot on the position sensitive light receiving element 104, the light spot being sufficiently smaller than an effective receiving surface of the position sensitive light receiving element 104.

When the object to be measured 108 rotates only by an angle $\Phi$, as shown in FIG. 5, the object to be measured 108 moves away from the sensor head by a distance Z which is measured in the vicinity of the incidence position of the outgoing light beam 105a incident upon the object to be measured 108. At this time, the directly reflected light beam 401 from the object to be measured 108 changes to a directly reflected light beam 401' and therefore the incidence position of the light beam incident upon the position sensitive light receiving element 104 changes only by a distance X. Thus, by detecting the incidence position of the light beam incident upon the position sensitive light receiving element 104, the optical distance sensor can measure the rotation angle, displacement, and location of the object to be measured 108.

Figure 6:
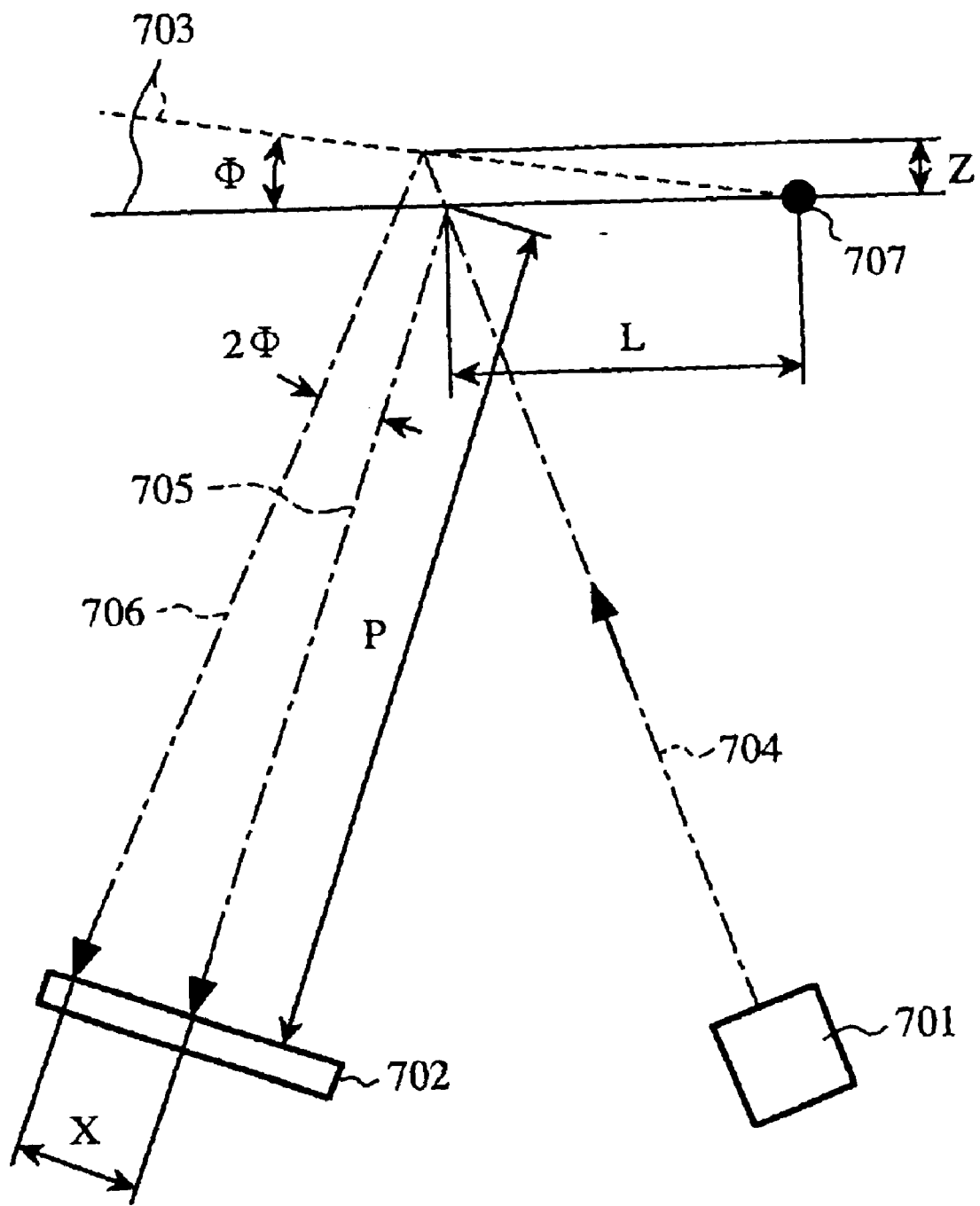
FIG. 6 is a drawing for explaining the principle of an optical lever method of detecting a directly reflected light beam from an object to be measured, which the sensor head according to embodiment 1 of the present invention employs.

FIG. 6 is a view for explaining the principle of the optical lever method of detecting the directly reflected light beam from the object to be measured. An outgoing light beam 704 emitted out of a light emitting element 701 is incident upon an object to be measured 703, and a directly reflected light beam 705 is incident upon a position sensitive light receiving element 702. When the object to be measured 703 rotates about its rotation axis 707 by only an angle $\Phi$, as shown in the figure, the incidence position of the light beam incident upon the position sensitive light receiving element 702 changes only by a distance X, as indicated by a directly reflected light beam 706. When the angle $\Phi$ is sufficiently small, the displacement Z in the vicinity of the incidence position of the outgoing light beam 704 incident on the object to be measured 703 can be approximated by the following equation (1).

$$Z = L \times \phi \tag{1}$$

Furthermore, the amount of displacement X of the incidence position of the directly reflected light beam incident on the position sensitive light receiving element 702 can be given by the following equation (2).

$$X = P \times 2\phi \tag{2}$$

Therefore, the angle of rotation $\Phi$ of the object to be measured 703 and the amount of displacement Z of the object in the vicinity of the incidence position of the outgoing light beam 704 on the object are given by the following equations (3) and (4), and the angle of rotation, amount of displacement, and location of the object to be measured 703 can be measured by detecting the incidence position of the light beam on the position sensitive light receiving element 702.

$$\phi = \frac{X}{2 \times P} \tag{3}$$

$$Z = \frac{L}{2 \times P} \times X \tag{4}$$

And, the curvature of the curved surface and inclination against the optical axis of an incident light beam of each of the mirrors intended for converging incident light in the parallel direction to a surface of a substrate are determined so that they are based on the principle of this optical lever method.

As mentioned above, in accordance with this embodiment 1, since the optical structure body 112 is formed in one piece using a photolithography technology or plastic molding which derives from the technology, the downsizing of the optical distance sensor is facilitated and the plurality of mirrors 106a to 106f intended for converging incident light in the parallel direction to a surface of a substrate can be formed with an extremely high degree of relative positioning accuracy. Furthermore, since the lenses 107a and 107b intended for converging incident light in the perpendicular direction to a surface of a substrate are arranged so that they are in contact with at least two surfaces of a vertical structure disposed in the optical structure body 112, the positioning of those lenses is facilitated and the accuracy of the relative positions of those lenses with respect to the plurality of mirrors intended for converging incident light in the parallel direction to a surface of a substrate can be improved. As a result, there can be provided a small-size and low-cost sensor head whose signal-to-noise ratio is improved, without having to use a three-layer waveguide with a large manufacturing cost.

Referring now to FIGS. 7(a)–7(d), there are illustrated views for explaining processes of producing the optical structure body 112. A resist material, such as PMMA (polymethyl methacrylate) for use in photolithography, is used. X rays are the best for an exposure with good accuracy of a thick film resist. A process known by the name of LIGA (an acronym for a German technical term, LI: Lithographie= Lithography, G: Galvanoformung=electroforming, and A: Abformung=molding) is applicable. Since X rays have good straightness, one or more accurate cylindrical structures each having a thickness ranging from hundreds of micrometers to about 1 millimeter can be transformed in the thick film resist.

Figure 7A:
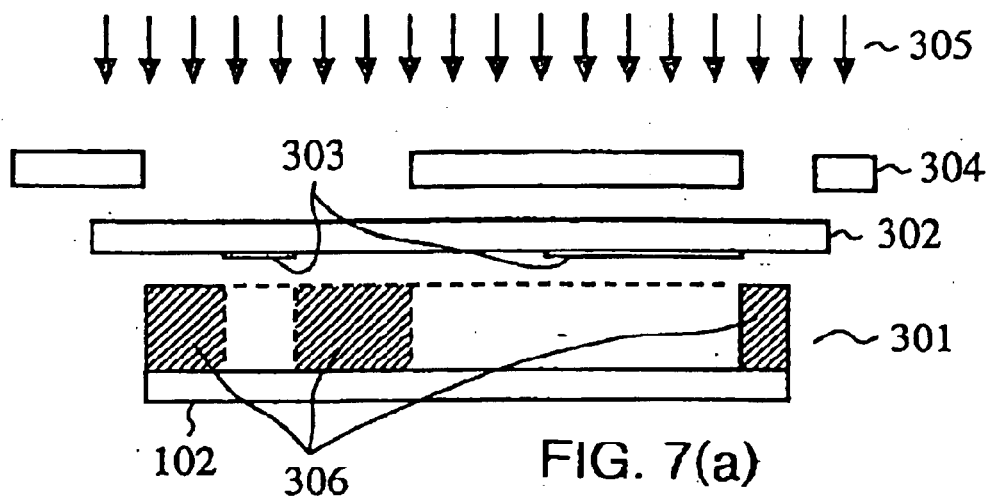
FIGS. 7(a)–7(c) are views for explaining processes of manufacturing an optical structure body.

In FIG. 7(a), a resist 301 is arranged on the substrate 102. X-ray absorption films 303 made of such a material as gold, on which the plurality of mirrors 106a to 106f intended for converging incident light in the parallel direction to a surface of a substrate and other structures extending in the perpendicular direction to a surface of a substrate are rendered, respectively, are formed on a mask 302. An aperture 304 made of such an X-ray absorption material as brass is disposed above the mask 302, and X rays 305 are applied from the upper side of the aperture 304. Some areas of the resist 301, which are not hidden by the X-ray absorption films 303 and by the aperture 304, i.e., only exposure areas 306 are exposed to X rays.

Figure 7B:
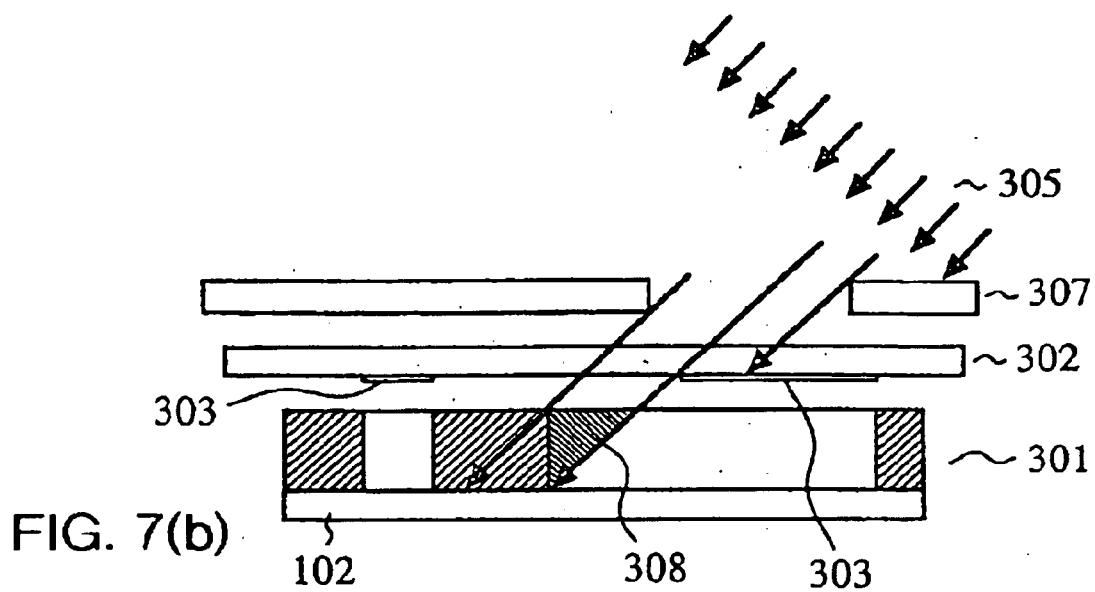
Figure 7C:
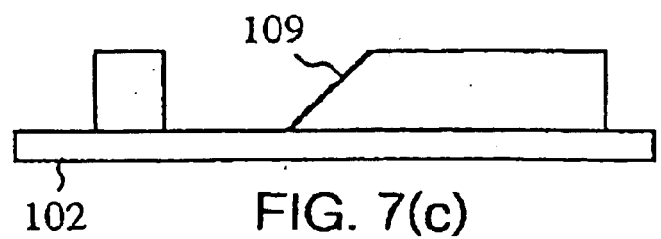

In FIG. 7(b), the aperture 304 is replaced by another aperture 307, and X rays are further applied to the resist 301 while the direction of the irradiation being inclined 45 degrees against the vertical. In the case of FIG. 7(b), only an exposure area 308 is exposed to X rays 305. After exposed to X rays, the exposure areas 306 and 308 are removed when developed. As a result, vertical structures, such as the plurality of mirrors 106a to 106f intended for converging incident light in the parallel direction to a surface of a substrate and the mirror 109 intended for deflection of the optical axis of an incident light beam are formed in one piece on the substrate 102, as shown in FIG. 7(c).

In the case of an optical distance sensor which does not use the mirror 109 intended for deflection of the optical axis of an incident light beam, the process of FIG. 7(b) is omitted. In general, since PMMA is a transparent resin, each of all the mirror faces is provided with a reflection coating formed through deposition or the like, and each of other vertical walls is provided with either a reflection coating or an absorption film to prevent stray light.

Furthermore, to improve the quality of mass production and to reduce the manufacturing cost, a molding process can be introduced into the above-mentioned LIGA process. In this case, the substrate on which the developed optical structure body is mounted is electroformed so that metal such as Ni is deposited on a surface of the substrate. The metal is separated from the electroformed substrate so that a blank body having the same shape as the optical structure body is transformed in the metal. When this metal is used as a mold insert and plastic molding such as injection molding is carried out using the mold insert, many copies of the optical structure body can be provided.

The above-mentioned LIGA process can be applied to producing of the lenses 107a and 107b intended for converging incident light in the perpendicular direction to a surface of a substrate. Only one X-ray exposure is needed for the producing of the lenses 107a and 107b because cylindrical lenses are used as the lenses 107a and 107b in this embodiment, while two exposures are carried out in the case shown in FIG. 7.

Since the lenses 107a and 107b intended for converging incident light in the perpendicular direction to a surface of a substrate are arranged so that they are in contact with at least two surfaces of a vertical structure disposed in the optical structure body 112, the positioning of those lenses is facilitated and the relative positioning accuracy of those lenses with respect to the plurality of mirrors 106a to 106f intended for converging incident light in the parallel direction to a surface of a substrate can be improved. It is preferable to use an ultraviolet curing resin bond with a low viscosity to maintain the positioning accuracy when securing the lenses 107a and 107b to the optical structure body 112.

The optical structure body 112 provided with the lenses 107a and 107b intended for converging incident light in the perpendicular direction to a surface of a substrate and the substrate 102 are combined with the other substrate 101 provided with the light emitting element 103 and the position sensitive light receiving element 104 by using a positioning mark or the like (not shown in the figure). It is preferable to use an ultraviolet curing resin bond with a low viscosity to maintain the positioning accuracy when securing the optical structure body 112 and the second substrate 102 to the first substrate 101.

In this embodiment 1, two mirrors intended for converging the outgoing light beam 105a in the parallel direction to a surface of a substrate and four mirrors intended for converging the outgoing light beam 105b in the parallel direction to a surface of a substrate are provided. The present embodiment is not limited to this case, and one or more mirrors intended for converging the outgoing light beam 105a in the parallel direction to a surface of a substrate and one or more mirrors intended for converging the outgoing light beam 105b in the parallel direction to a surface of a substrate can be provided. The whole optical system intended for converging incident light in the parallel direction to a surface of a substrate with high accuracy can be implemented by a combination of concave mirrors and convex mirrors rather than a combination of only concave mirrors.

Embodiment 2.

Figure 8:
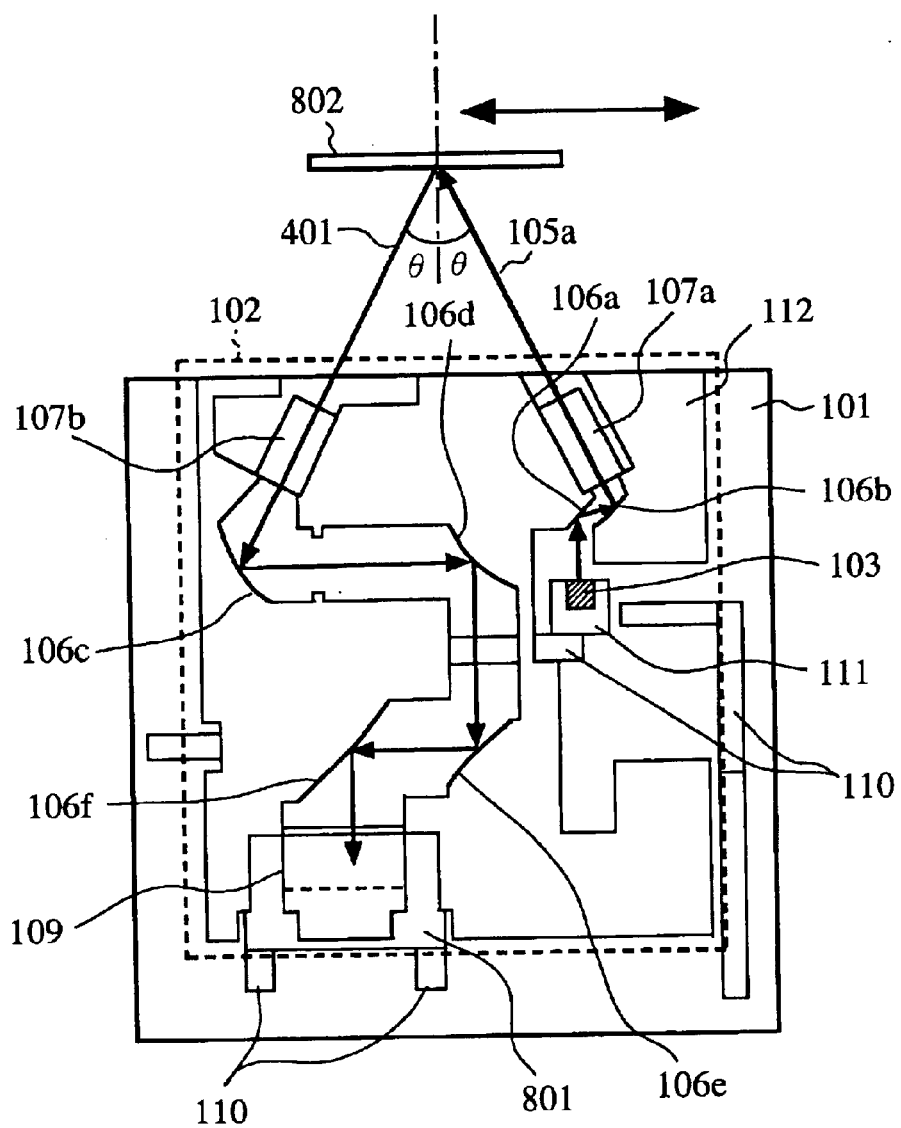
FIG. 8 is a plan view of a sensor head according to embodiment 2 of the present invention.

FIG. 8 is a plan view showing an optical distance sensor according to embodiment 2 of the present invention. Lenses 107a and 107b each intended for converging an incident light beam in a perpendicular direction to a surface of a substrate are arranged so that an outgoing light beam 105a emerging from the lens 107a hits an object to be measured 802 and a directly reflected light beam 401 reflected by the object is incident upon the other lens 107b.

Figure 9:
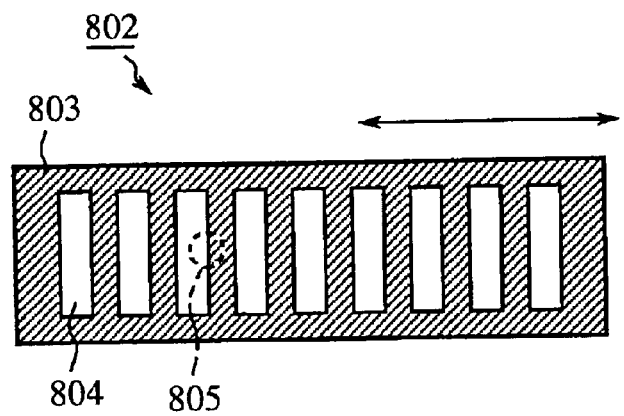
FIG. 9 is a front elevation of a scale board.

In this embodiment 2, the object to be measured 802 is a scale board provided with rectangular apertures, for example, and the displacement and travel speed in the direction of the arrow of this scale board can be measured. As shown in FIG. 9, the scale board is formed by applying a reflection coating 803 made of such a material as chromium on a transparent plate made of such a material as glass and by etching the coating by using an electronic direct writing technique so as to form the apertures 804. Therefore, the ratio of the power of reflected light and the power of transmitted light changes according to the incidence position of an incident light beam 805. A light receiving element 801 disposed on a substrate 101 can be a photo diode or photo transistor having a single receiving surface rather than a position sensitive light receiving element.

Next, a description will be made as to the operation of the sensor head of embodiment 2.

After the outgoing light beam 105a emitted out of a light emitting element 103 is collimated or is brought to a focus on the object to be measured 802 by mirrors 106a and 106b intended for converging incident light in a parallel direction to a surface of a substrate and the lens 107a intended for converging incident light in the perpendicular direction to a surface of a substrate, the outgoing light beam 105a is incident upon the object to be measured 802. At this time, the power of the directly reflected light beam 401 changes according to the incidence position of the directly reflected light beam incident upon the object to be measured 802.

The directly reflected light beam 401 from the scale as the object to be measured 802 is then converged by the lens 107b intended for converging incident light in the perpendicular direction to a surface of a substrate and by mirrors 106c to 106f intended for converging incident light in the parallel direction to a surface of a substrate. Then, after the optical axis of the directly reflected light beam 401 is bent by 90 degrees by another mirror 109 intended for deflection of the optical axis of an incident light beam, the directly reflected light beam 401 is incident upon the light receiving element 801. The curvature of the lens 107b intended for converging incident light in the perpendicular direction to a surface of a substrate and the shape of the curved surface and inclination against the optical axis of an incident light beam of each of the mirrors 106c to 106f intended for converging incident light in the parallel direction to a surface of a substrate are determined such that the directly reflected light beam 401 is focused to a small light spot on the light receiving element 801, the light spot being sufficiently smaller than an effective receiving surface of the light receiving element 801.

Any change in the power of the directly reflected light beam 401 according to a displacement of the object to be measured 802 in the direction of the arrow of FIG. 8 can be observed by detection of an output signal from the light receiving element 801. This output signal is a periodic output such as a rectangular wave or pseudosine wave. When the wave number of the output signal is M and the period of the array of apertures 804 formed in the scale, which is the object to be measured 802, is P, the amount of displacement Z can be given by the following equation (5). So, by measuring the wave number M, the amount of displacement Z can be measured. Furthermore, the travel speed can be measured by measuring the time period of the observed wave.

$$Z = M \times P \quad (5)$$

When the light receiving element 801 is a position sensitive light receiving element, such as PSD, that can measure position information about an incident light beam and the power of the incident light beam at the same time, for example, the sensor head mentioned in this embodiment 2 can measure the amount of displacement of the object to be measured 802 in a direction perpendicular to the direction in which the object is moving at the same time.

Although the object to be measured 802 shown in FIG. 8 is a rectangular scale board. Alternatively, the object can be a circle-shaped scale board in which a plurality of rectangular apertures 804 are arranged in the direction of the circumference of the circle. In this case, the amount of rotational transfer and rotational speed can be measured.

As mentioned above, in accordance with this embodiment 2, since the optical structure body 112 is formed in one piece using a photolithography technology or plastic molding which derives from the technology, the downsizing of the sensor head is facilitated and the plurality of mirrors 106a to 106f intended for converging incident light in the parallel direction to a surface of a substrate can be formed with an extremely high degree of relative positioning accuracy. Furthermore, since the lens 107a and 107b intended for converging incident light in the perpendicular direction to a surface of a substrate are arranged so that they are in contact with at least two surfaces of a vertical structure disposed in the optical structure body 112, the positioning of those lenses is facilitated and the accuracy of the relative positions of those lenses with respect to the plurality of mirrors intended for converging incident light in the parallel direction to a surface of a substrate can be improved.

Embodiment 3.

Figure 10:
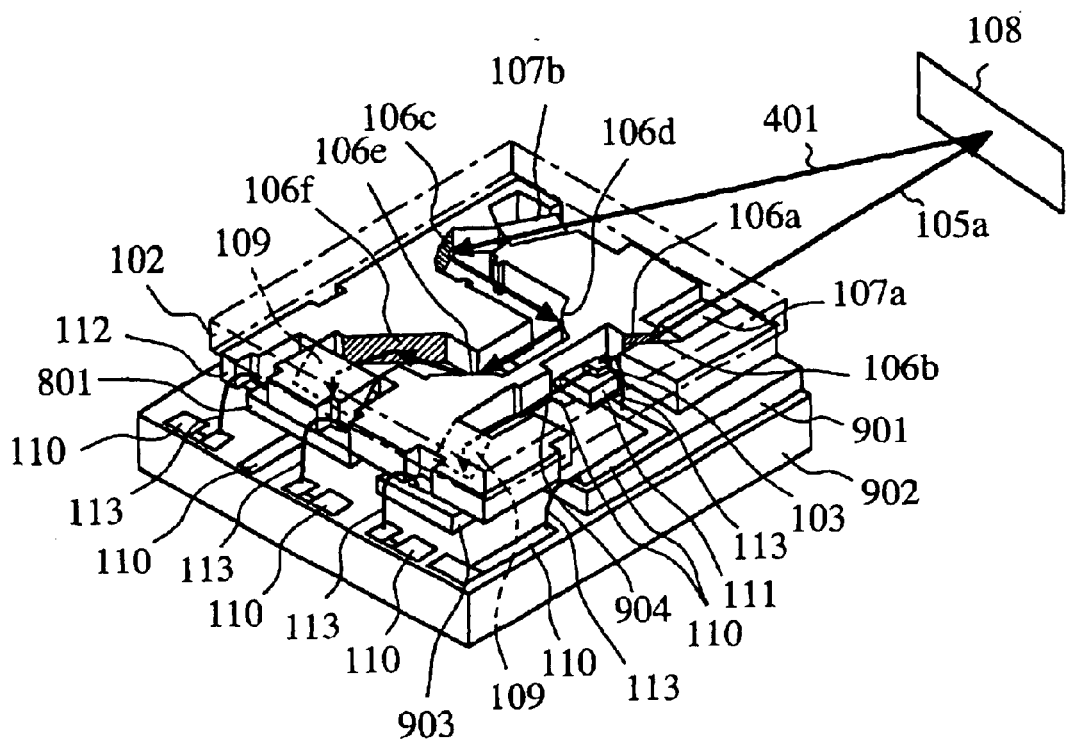
FIG. 10 is a perspective view of a sensor head according to embodiment 3 of the present invention.

FIG. 10 is a perspective view showing a sensor head according to embodiment 3 of the present invention. A laminated substrate which is a combination of a substrate 901 provided with a light emitting element 103 and another substrate 902 provided with a light receiving element 801 implements functionality similar to that provided by the substrate 101 (first substrate) shown in embodiments 1 and 2. The electric connection between the two substrates 901 and 902 is achieved by a metallic wire 113. In other words, the light receiving element 801 does not have to be monolithically formed, unlike those of embodiments 1 and 2.

A semiconductor laser can be used as the light emitting element 103. At this time, by adding an optical axis deflection mirror 109 and a light receiving element 903, such as a photo diode or photo transistor, the power of a light beam 904 travelling opposite in direction to the travel of an outgoing light beam 105a can be detected. Since the power of the outgoing light beam 105a and that of the light beam 904 are in direct proportion, the power of the outgoing light beam 105a emitted from the sensor head can be controlled by controlling the power of the light beam 904. To prevent the light receiving elements 801 and 903 from being in contact with the optical structure body 112, the heights of the light receiving elements 801 and 903 are set to be lower than that of the substrate 901.

As mentioned above, in accordance with embodiment 3, information on physical quantities of the object to be measured can be acquired by optimizing the shape of the optical structure body 112 and the shapes of the lenses 107a and 107b intended for converging incident light in the perpendicular direction to a surface of a substrate, like embodiments 1 and 2.

Embodiment 4.

Figure 11:
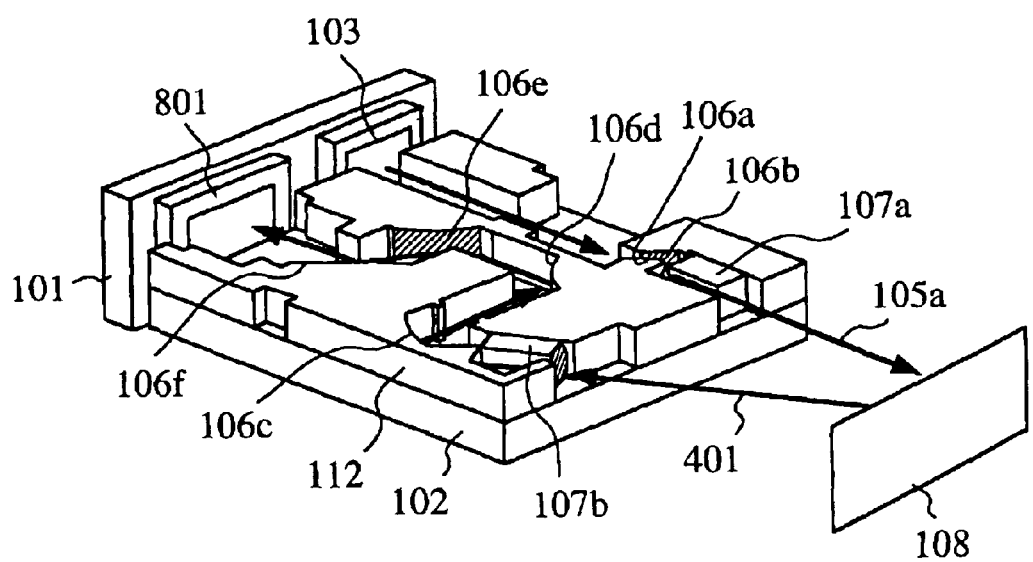
FIG. 11 is a perspective view of a sensor head according to embodiment 4 of the present invention.

FIG. 11 is a perspective view showing a sensor head according to embodiment 4 of the present invention. In the sensor head of this embodiment, a substrate 101 provided with a light emitting element 103 and a light detecting element 801 is combined with another substrate 102 provided with an optical structure body 112 so that the substrate 101 is attached to a side of the other substrate 102, and a semiconductor laser of the vertical cavity type is used as the light emitting element 103.

Therefore, no mirror 109 intended for deflection of the optical axis of an incident light beam is needed in the optical structure body 112, unlike embodiments 1 and 2. Although electric I/Os of the light emitting element 103 and the light receiving element 801 are not shown in the figure, they are carried out through electric wiring and metallic wires. Furthermore, the optical structure body 112 can be covered with a board made of such a material as silicon and having the same size as the substrate 102 to block disturbance light. In general, semiconductor lasers of vertical cavity type have a narrow angle of light emission because they have a wide surface area of light emission. In addition, since semiconductor lasers of vertical cavity type emit a circular light beam, the optical system design for beam forming becomes easy according to embodiment 4.

As mentioned above, in accordance with embodiment 4, information on physical quantities of the object to be measured can be acquired by optimizing the shape of the optical structure body 112 and the shapes of the lenses 107a and 107b intended for converging incident light in the perpendicular direction to a surface of a substrate, like embodiments 1 and 2.

Embodiment 5.

Figure 12:
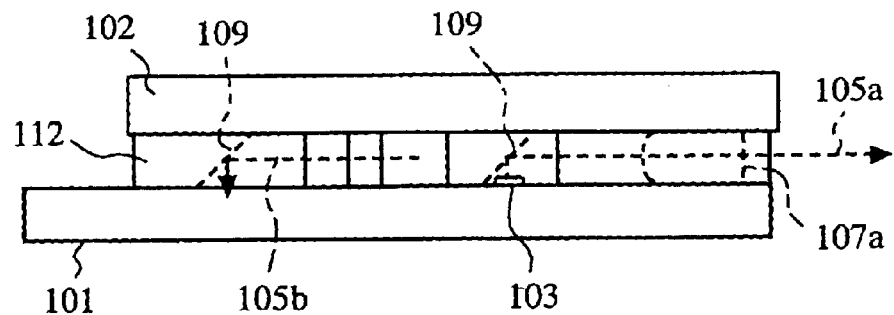
FIG. 12 is a side view of a sensor head according to embodiment 5 of the present invention.

FIG. 12 is a side view showing a sensor head according to embodiment 5 of the present invention. A semiconductor laser of vertical cavity type is used as a light emitting element 103, a mirror 109 intended for deflection of the optical axis of an incident light beam is disposed above the light emitting element 103, and the direction in which an outgoing light beam 105a emitted out of the light emitting element 103 is travelling is deflected by 90 degrees by the optical axis deflection mirror 109.

As mentioned above, in accordance with embodiment 5, information on physical quantities of the object to be measured can be acquired by optimizing the shape of the optical structure body 112 and the shapes of the lenses 107a and 107b intended for converging incident light in the perpendicular direction to a surface of a substrate, like embodiments 1 and 2.

Embodiment 6.

Figure 13:
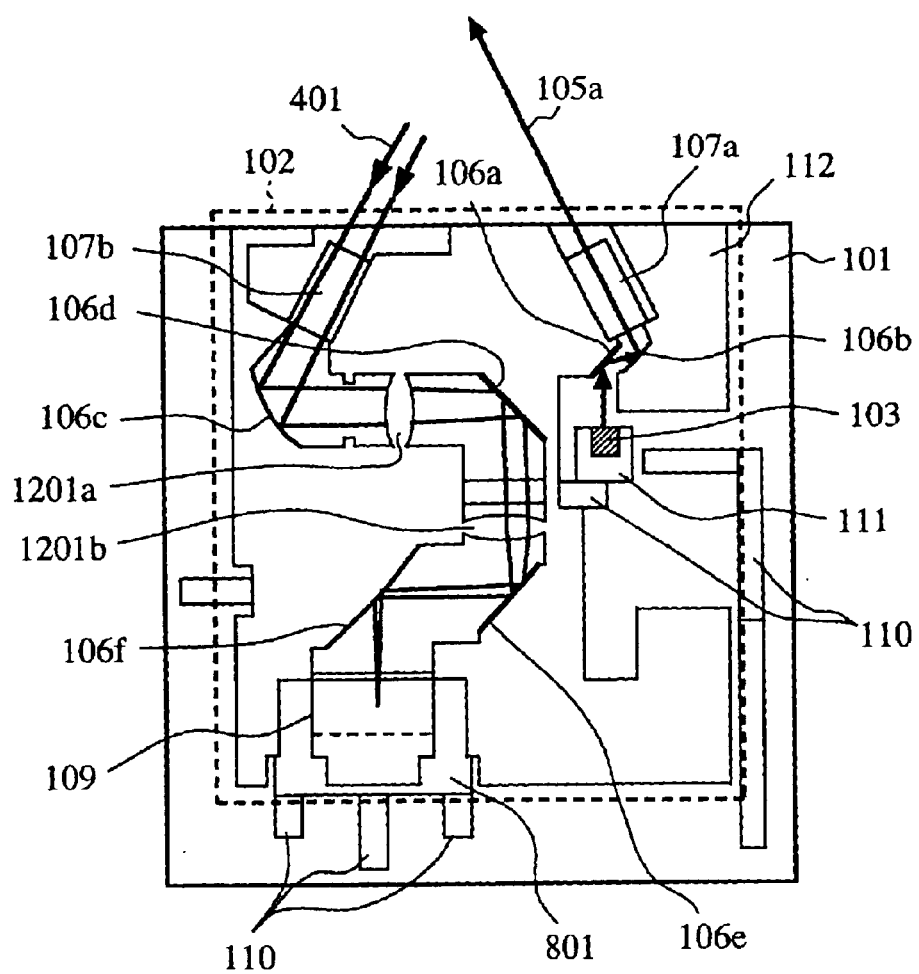
FIG. 13 is a plan view of a sensor head according to embodiment 6 of the present invention.

FIG. 13 is a plan view showing a sensor head according to embodiment 6 of the present invention. Lenses 1201a and 1201b (lenses intended for converging incident light in a parallel direction to a surface of a substrate) having a function of converging an incident light beam in the parallel direction to a surface of a substrate, as well as mirrors 106a to 106f intended for converging incident light in the parallel direction to a surface of a substrate and a mirror 109 intended for deflection of the optical axis of an incident light beam, are formed in one piece in an optical structure body 112. In the case of this embodiment 6, the function of converging a directly reflected light beam 401 in the parallel direction to a surface of a substrate can be mainly provided for the combination of lenses 1201a and 1201b. Some or all of the mirrors 106c to 106f intended for converging incident light in the parallel direction to a surface of a substrate can be plane mirrors according to settings.

In the case of this embodiment 6, it is preferable that the optical structure body 112 is made of a transparent resin, such as PMMA, which the outgoing light beam 105b can penetrate. Though the plurality of mirrors 106a to 106f intended for converging incident light in the parallel direction to a surface of a substrate and the mirror 109 intended for deflection of the optical axis of an incident light beam should have a reflection coating formed through deposition or the like, it is necessary to dispose a mask made of such a material as brass on the optical structure body 112 to prevent the reflection coating from spreading to the lenses 1201a and 1201b intended for converging incident light in the parallel direction to a surface of a substrate when forming the reflection coating.

While the plurality of mirrors 106c to 106f intended for converging incident light in the parallel direction to a surface of a substrate are effective in the downsizing of the optical structure body 112 when it is necessary to lengthen an optical path extending from the lens 107b intended for converging incident light in the perpendicular direction to a surface of a substrate to a light receiving element 801, the plurality of mirrors 106c to 106f intended for converging incident light in the parallel direction to a surface of a substrate are not needed when it is unnecessary to lengthen the optical path and the directly reflected light beam 401 can be converged in the parallel direction to a surface of a substrate only by the lenses 1201a and 1201b intended for converging incident light in the parallel direction to a surface of a substrate. It is also possible to use lenses intended for converging incident light in the parallel direction to a surface of a substrate instead of the mirrors 106a and 106b intended for converging the outgoing light beam 105a in the parallel direction to a surface of a substrate.

As mentioned above, in accordance with embodiment 6, information on physical quantities of the object to be measured can be acquired by optimizing the shape of the optical structure body 112 and the shapes of the lenses 107a and 107b intended for converging incident light in the perpendicular direction to a surface of a substrate, like embodiments 1 and 2.

Embodiment 7.

Figure 14:
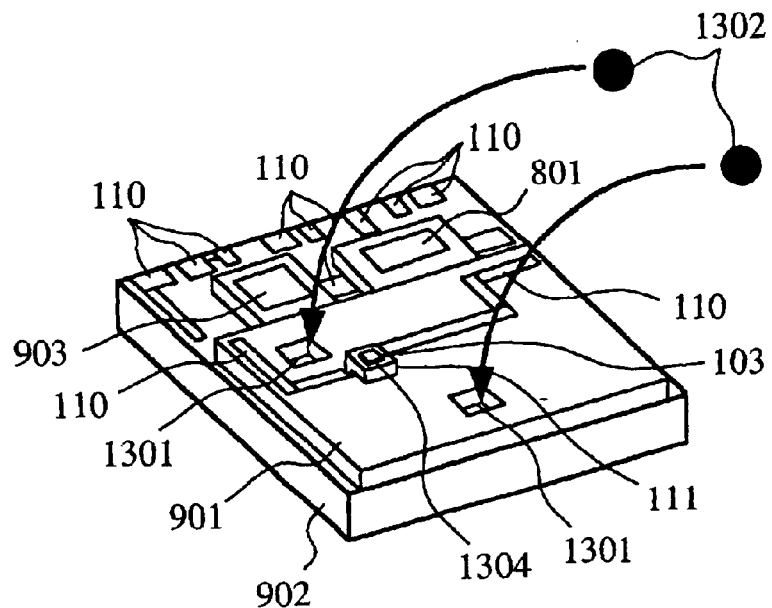
FIG. 14 is a view for explaining processes of assembling a sensor head according to embodiment 7 of the present invention.
Figure 15:
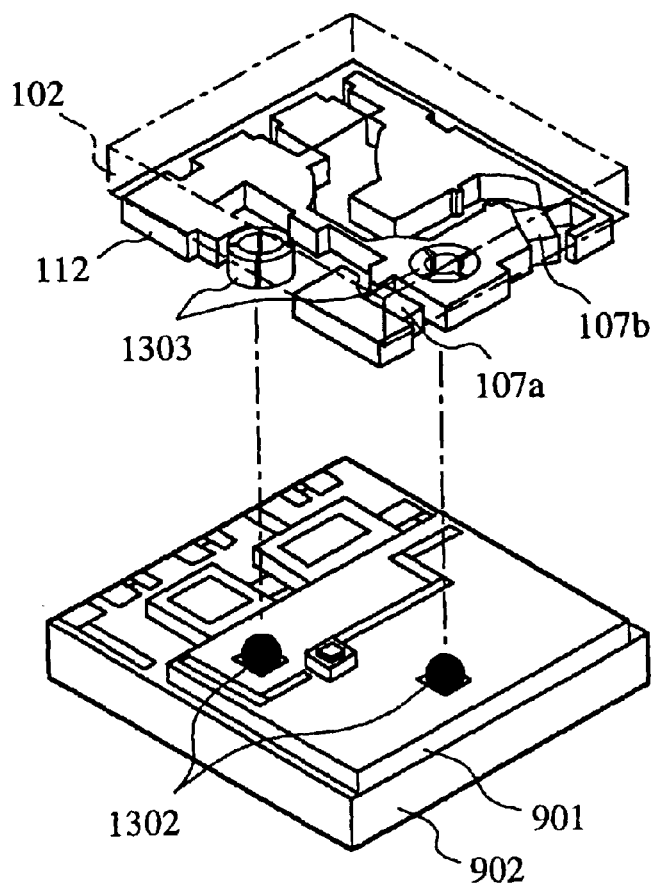
FIG. 15 is a view for explaining a process of assembling an optical structure body.

FIG. 14 is a view for explaining a process of assembling a sensor head according to embodiment 7 of the present invention, FIG. 15 is an exploded perspective view showing the assembling process, and FIG. 16 is a view for explaining the assembling process. As shown in FIG. 14, on a substrate 901 made of, for example, silicon, two grooves 1301 shaped like a regular quadrangular pyramid or regular cone are formed through wet etching or the like at points which are opposite to each other with a light emitting point 1304 of a light emitting element 103 being placed between the two grooves. Cylindrical microsphere holders 1303 are disposed in the optical structure body 112, as shown in FIG. 15.

When the set of grooves 1301 is made to be in desired alignment with the set of holders 1303, the central axis of the opening of each groove 1301 agrees with the central axis of the opening of the corresponding microsphere holder 1303. Although each microsphere holder 1303 has an internal diameter slightly smaller than the diameter of the corresponding microsphere 1302 inserted thereinto, since four cracks are formed in each microsphere holder 1303, as shown in the figure, the internal diameter of each microsphere holder 1303 extends up to the diameter of the corresponding microsphere 1302 when the corresponding microsphere 1302 is inserted into each microsphere holder 1303 and forces to hold the microsphere 1302 are uniformly generated.

Figure 16A:
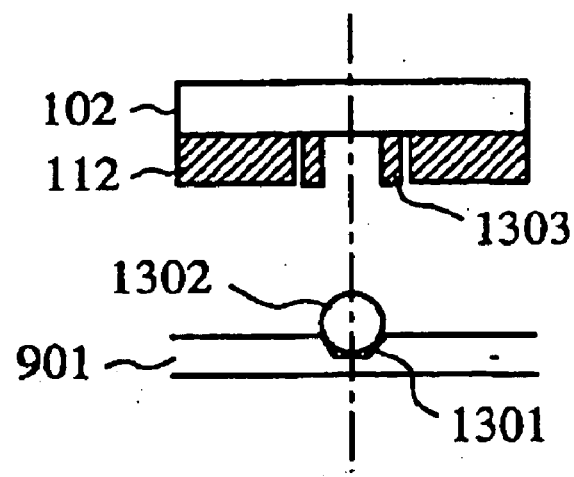
FIGS. 16(a)–16(c) are views for explaining the assembling processes.

First of all, each microsphere 1302 is inserted into the corresponding groove 1301, as shown in FIG. 16(a). The size of each microsphere 1302 is determined so that each microsphere 1302 is in contact with not a bottom or opening but only lateral surfaces of the corresponding groove 1301. Therefore, the center of each microsphere 1302 agrees with the center of the opening of the corresponding groove 1301 with respect to the parallel direction to a surface of the substrate 901. Furthermore, the half or more of each microsphere 1302 projects from the surface of the substrate 901.

Figure 16B:
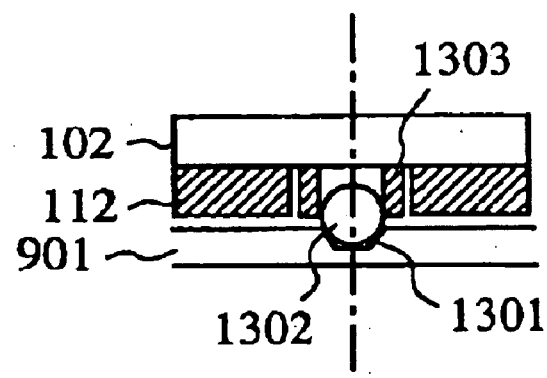
Figure 16C:
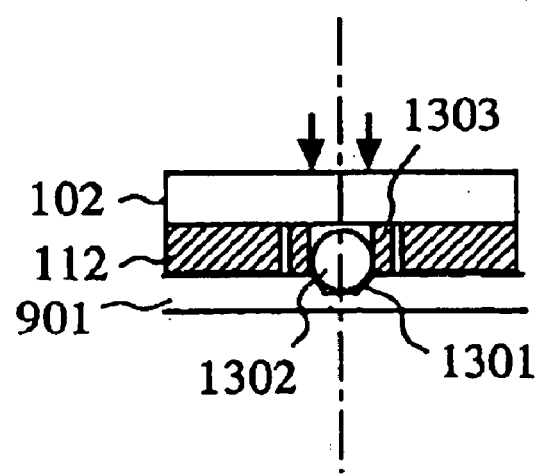

The optical structure body 112 and the substrate 102 are then combined with the other substrate 901 so that each microsphere 1302 is inserted in the corresponding microsphere holder 1303, as shown in FIG. 16(b). Finally, the assembling is completed by applying a force from the upper surface of the substrate 102, as shown in FIG. 16(c).

Since four portions which constitute each microsphere holder 1303 have equal sizes, they expand in substantially the same way when the corresponding microsphere 103 is inserted into each microsphere holder and the center position of each microsphere 1302 in the parallel direction to the surface of the substrate 901 substantially agrees with the center position of the opening of the corresponding microsphere holder 1303. Therefore, the central axis of the opening of each groove 1301 substantially agrees with the central axis of the opening of the corresponding microsphere holder 1303, and therefore the accuracy of the relative position between the optical structure body 112 and the light emitting point 1304 of the light emitting element 103 can be easily improved.

When the substrate 901 is combined with the optical structure body 112 by way of the two microspheres 1302, as mentioned above, if in FIG. 16(a) the relative position between the substrate 901 and the optical structure body 112 in the parallel direction to a surface of a substrate 901 has a deviation less than the radius of each microsphere 1302, after the optical structure body 112 and the microspheres 1302 come in contact with each other the optical structure body 112 can be led automatically to a desired position along the spheres of the microspheres 1302 by gradually pushing the optical structure body 112 toward the microspheres 1302, thereby facilitating the assembling of the sensor head.

In this embodiment 7, instead of previously arranging the two microspheres 1302 in the two grooves 1301, respectively, before combining the optical structure body 112 with the substrate 901, the same advantage is provided even when the two microspheres 1302 are previously inserted into the two microsphere holders 1303, respectively. However, the height of a projecting portion of each microsphere 1302 projecting from the corresponding microsphere holder 1303 should be greater than the preset depth of the corresponding groove 1301 into which each microsphere 1302 is embedded.

The number of pairs of groove 1301, microsphere 1302, and microsphere holder 1303 only has to be two or more. Furthermore, though the number of cracks formed in each microsphere holder 1303 only has to be one or more, it is preferable that each microsphere holder 1303 uniformly expands around its central axis when the corresponding microsphere 1302 is inserted into each microsphere holder 1303.

In the sensor head of this embodiment 7, the substrate 901 provided with the light emitting element 103 is combined with the other substrate 902 provided with the light receiving elements 801 and 903, as previously explained. The sensor head according to embodiment 1 in which these components are monolithically fabricated can have the same mechanism of this embodiment.

As mentioned above, in accordance with this embodiment 7, information on physical quantities of an object to be measured can be obtained by optimizing the shape of the optical structure body 112 and the shapes of the lenses 107a and 107b intended for converging incident light in the perpendicular direction to a surface of a substrate, like embodiments 1 and 2.

Embodiment 8.

Figure 17:
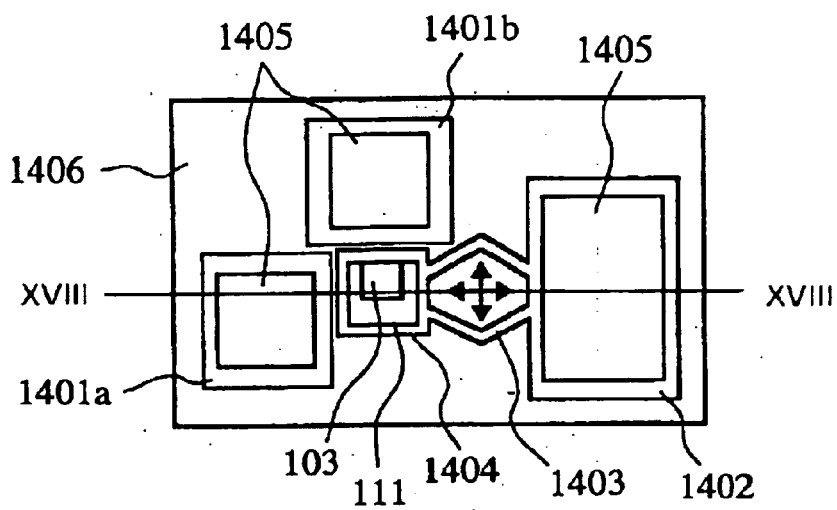
FIG. 17 is a plan view of a sensor head according to embodiment 8 of the present invention.
Figure 18:
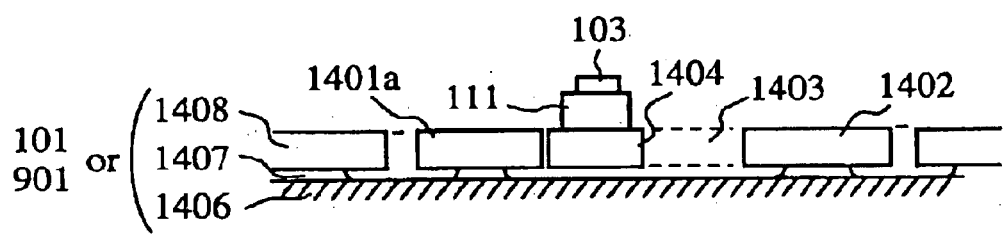
FIG. 18 is an enlarged transverse sectional view taken along the line XVIII—XVIII of FIG. 17.

FIG. 17 is a plan view showing a sensor head according to embodiment 8 of the present invention, and FIG. 18 is an enlarged transverse sectional view taken along the line XVIII—XVIII of FIG. 17. A light emitting element 103 is placed on a movable plate 1404 by way of a spacer 111. The movable plate 1404 is held by two beams 1403 coupled to a fixed portion 1402. Fixed electrodes 1401a and 1401b are arranged with a certain gap between them in the vicinity of the movable plate 1404. Conducting thin films 1405 made of such a material as gold are disposed on the upper surfaces of the fixed electrodes 1401a and 1401b. A substrate 101 or 901 consists of a basic substrate 1406 made of such a material as silicon, an insulating film 1407 made of such a material as silicon oxide, and a conductive layer 1408 made of such a material as polysilicon doped with impurities.

The movable plate 1404 can be displaced in directions of arrows of FIG. 17 by generating an electrostatic force which works between the fixed electrodes 1401a and 1401b and the movable plate 1404 by giving a suitable potential difference among the fixed portion 1402 and the fixed electrodes 1401a and 1401b by way of the conducting thin films 1405.

In other words, since the light emitting element 103 is movable, the accuracy of the relative position of the light emitting element 103 with respect to the optical structure body 112 is easily improved. The above-mentioned potential difference is unnecessary if a nonconductivity adhesive is applied to the movable plate 1404 with the light emitting element 103 being fixed at an optimal position so that the movable plate 1404 is fixed. Although electric inputs to the conducting thin films 1405 and the light emitting element 103 are not shown in the figure, they are carried out through electric wiring and metallic wires.

Next, a method of producing the fixed portion 1402, the, fixed electrodes 1401a and 1401b, the beams 1403, and the movable plate 1404 of this embodiment 8 will be explained. The substrate 101 or 901 is constructed by disposing an insulation film 1407 and a conducting layer 1408 on the basic substrate 1406. By then etching only the conducting layer 1408 through reactive ion etching or the like, the fixed portion 1402, the fixed electrodes 1401a and 1401b, the beams 1403, and the movable plate 1404 are formed on the insulation film 1407.

Then isotropic etching is performed on the insulation film 1407 through wet etching, and parts of the insulation film 1407 under the beams 1403 and the movable plate 1404 are removed and the etching is completed. Since the beams 1403 are shaped like a spring, the movable plate 1404 can be displaced in the parallel direction to a surface of a substrate.

As mentioned above, in accordance with this embodiment 8, information on physical quantities of an object to be measured can be obtained by optimizing the shape of the optical structure body 112 and the shapes of lenses 107a and 107b intended for converging incident light in the perpendicular direction to a surface of a substrate, like embodiments 1 and 2.

Embodiment 9.

Figure 19:
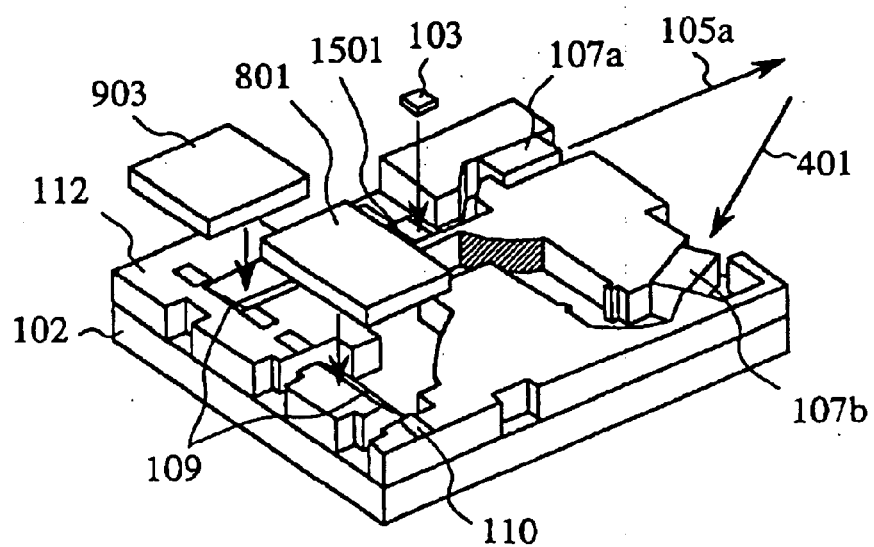
FIG. 19 is a perspective view of a sensor head according to embodiment 9 of the present invention.

FIG. 19 is a perspective view showing a sensor head according to embodiment 9 of the present invention. A spacer 1501 formed in one piece like other structures so that the optical axis of an outgoing light beam 105a emitted out of a light emitting element 103 agrees, in height, with the central axis of a lens 107a intended for converging incident light in a perpendicular direction to a surface of a substrate and electric wiring 110 necessary for electric I/Os are disposed on an optical structure body 112.

The light emitting element 103 and light detecting elements 801 and 903 are mounted directly on the optical structure body 112, and the optical structure body 112 has the functionality of the substrate 101 or the substrates 901 and 902 disclosed in the above-mentioned embodiments. Since the substrate 101 or the substrates 901 and 902 become unnecessary, the sensor head can be further downsized and the manufacturing cost of the sensor head can be reduced.

The optical structure body 112 can be covered with a board made of such a material as silicon and having the same size as a substrate 102 to prevent disturbance light. A groove for facilitating the positioning of the light emitting element 103 and the light detecting elements 801 and 903 can be formed in the optical structure body 112.

As mentioned above, in accordance with this embodiment 8, information on physical quantities of an object to be measured can be obtained by optimizing the shape of the optical structure body 112 and the shapes of the lenses 107a and 107b intended for converging incident light in the perpendicular direction to a surface of a substrate, like embodiments 1 and 2.

Embodiment 10.

FIGS. 20(a)–20(d) are views for explaining processes of producing a sensor head according to embodiment 10 of the present invention. Though it is possible to combine an optical structure body 112 on a substrate 102 and lenses 107a and 107b intended for converging incident light in a perpendicular direction, which are separately formed through plastic molding, both the optical structure body and the lenses can be formed in one piece by combining mold inserts used for plastic molding in this embodiment 10.

Figure 20A:
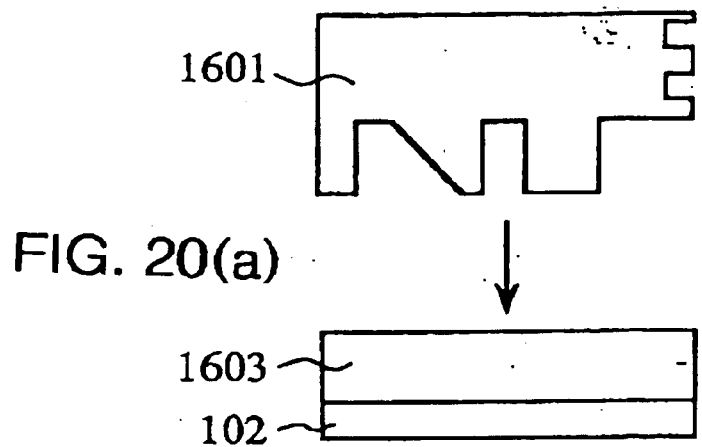
FIGS. 20(a)–20(d) are views for explaining processes of manufacturing a sensor bead according to embodiment 10 of the present invention.

First of all, as shown in FIG. 20(a), a resin 1603, such as PMMA, is disposed on the substrate 102 and a mold insert 1601 used for forming the optical structure body is pressed onto the resin after the resin is heated at a temperature more than the glass-transition temperature of PMMA. It is preferable to add a proper amount of mold insert releasing agent to the resin 1603 to facilitate mold insert releasing. This method is known as hot embossing method.

Figure 20B:
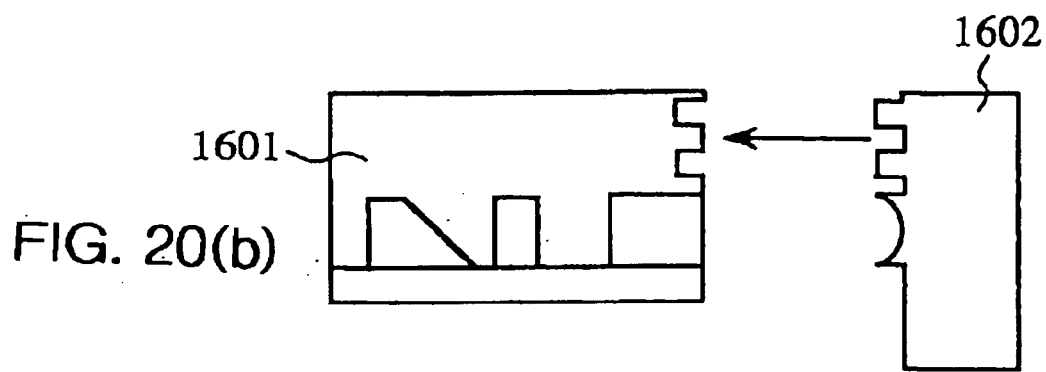
Figure 20C:
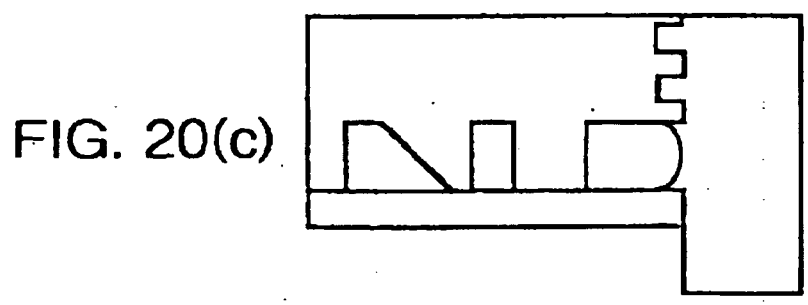
Figure 20D:
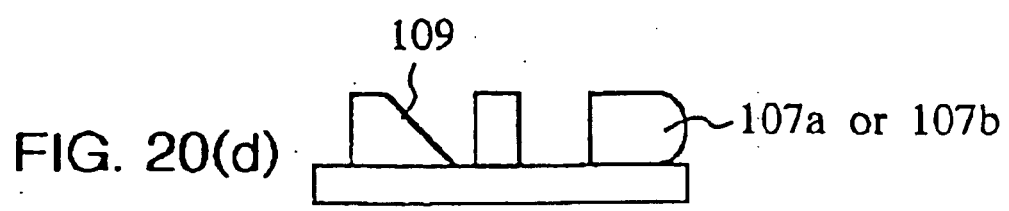

Next, when a mold insert 1602 used for forming the lenses intended for converging incident light in the perpendicular direction is pressed onto the resin from a side of the substrate, as shown in FIG. 20(b), the two mold inserts 1601 and 1602 are in alignment with each other with a high degree of accuracy by way of projections and depressions respectively formed on the two mold inserts, as shown in FIG. 20(c). Finally, the resin 1603 is cooled so that it coagulates and the two mold inserts 1602 and 1601 are released one by one from the resin. As a result, the optical structure body 112 and the lenses 107a and 107b intended for converging incident light in the perpendicular direction are provided, as shown in FIG. 20(d). Since the optical structure body 112 and the lenses 107a and 107b intended for converging incident light in the perpendicular direction are formed in one piece, the manufacturing cost can be reduced and the accuracy of the relative position among mirrors and the lenses can be improved.

In the sensor head according to this embodiment 10, each of the lenses 107a and 107b intended for converging incident light in the perpendicular direction has a planar face on a side of the inside of the sensor head to facilitate the releasing of the mold insert 1601 and a convex face on a side of the outside of the sensor head to converge a light beam emerging from the sensor head or a light beam incident upon the sensor head.

An injection molding method of injecting a resin of lower viscosity into a combination of the two mold inserts 1601 and 1602, instead of the hot embossing method, can be applied, so that the optical structure body 112 and the lenses 107a and 107b intended for converging incident light in the perpendicular direction can be formed in one piece, as in the above-mentioned case of embodiment 10.

As mentioned above, in accordance with this embodiment 10, information on physical quantities of an object to be measured can be obtained by optimizing the shape of the optical structure body 112 and the shapes of the lenses 107a and 107b intended for converging incident light in the perpendicular direction to a surface of a substrate, like embodiments 1 and 2.

INDUSTRIAL APPLICABILITY

As mentioned above, the sensor head according to the present invention is suitable for applying a light beam from a light emitting element to an object to be measured and detecting a light beam reflected by the object by using a light receiving element so as to acquire information on physical quantities of the object to be measured.

What is claimed is:

1. A sensor head that applies a light beam from a light producing element to an object and detects a light beam reflected by the object using a light detecting element to acquire information on physical quantities of the object, said sensor head comprising:

a first substrate on which are located a light producing element emitting light and a light detecting element producing an electrical signal in response to incident light;

a one-piece optical structure body on a second substrate, the optical structure body having a plurality of optical elements for converging incident light along a direction parallel to a surface of the second substrate, and for converging an outgoing beam from the light producing element and a light beam reflected by an object, along the direction parallel to the surface of the second substrate; and lenses for converging incident light along a direction perpendicular to the surface of the second substrate, and for converging the outgoing beam from the light producing element and the light beam reflected by the object, along the direction perpendicular to the surface of the second substrate, respectively.

2. The sensor head according to claim 1, including at least two microspheres interposed between the first substrate and the second substrate.

3. The sensor head according to claim 1, including a movable plate on the first substrate, wherein the light producing element is disposed on the movable plate.

4. The sensor head according to claim 1, wherein a mold insert used for molding the optical structure body with a resin and a mold insert used for molding the lenses for converging incident light along the direction perpendicular to the surface of the second substrate are combined and the optical structure body and the lenses for converging incident light along the direction perpendicular to the second substrate are one piece.

5. A sensor head that applies a light beam from a light producing element to an object and detects a light beam reflected by the object, using a light detecting element to acquire information on a physical quantity of the object, said sensor head comprising:

a light producing element emitting light and a light detecting element producing an electrical signal in response to incident light;

a one-piece optical structure body on a substrate, the optical structure body having a plurality of optical elements for converging incident along a direction parallel to a surface of the substrate, and for converging an outgoing beam from the light producing element and a light beam reflected by an object, along the direction parallel to the surface of the substrate, wherein the light producing element and the light detecting element are directly disposed on the optical structure body; and lenses for converging incident light along a direction perpendicular to the surface of the first substrate, and for converging the outgoing beam from the light producing element and the light being reflected by the object, along the direction perpendicular to the surface of the substrate, respectively.

* * * * *